US008960635B2

(12) United States Patent
Brendel et al.

(10) Patent No.: US 8,960,635 B2
(45) Date of Patent: Feb. 24, 2015

(54) RAFTER HOOK FOR FASTENING TOOL

(71) Applicant: Black & Decker Inc., Newark, DE (US)

(72) Inventors: Lee M. Brendel, Bel Air, MD (US); Michael P. Baron, Phoenix, MD (US); Stuart E. Garber, Towson, MD (US); Larry E. Gregory, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 58 days.

(21) Appl. No.: 13/800,983

(22) Filed: Mar. 13, 2013

(65) Prior Publication Data

US 2014/0097326 A1 Apr. 10, 2014

Related U.S. Application Data

(60) Provisional application No. 61/709,601, filed on Oct. 4, 2012.

(51) Int. Cl.

| | |
|---|---|
| ***F16M 11/00*** | (2006.01) |
| ***B25C 7/00*** | (2006.01) |
| ***B25F 5/02*** | (2006.01) |
| ***A45F 5/02*** | (2006.01) |

(52) U.S. Cl.

CPC ... *B25C 7/00* (2013.01); *B25F 5/02* (2013.01); *A45F 5/021* (2013.01)

USPC ............................ 248/692; 224/269; 224/268

(58) Field of Classification Search

CPC ............ B25H 3/006; B25H 3/00; B25F 5/02; B25F 5/00; Y10S 224/904; B25C 7/00

USPC ........... 248/690, 691, 692, 322; 224/269, 268

See application file for complete search history.

(56) References Cited

U.S. PATENT DOCUMENTS

| | | | | |
|---|---|---|---|---|
| 918,337 | A * | 4/1909 | Lamadrid | 248/691 |
| 976,638 | A * | 11/1910 | Corey | 135/65 |
| 6,655,560 | B2 * | 12/2003 | Kahn | 224/268 |
| 6,679,406 | B2 | 1/2004 | Sakai et al. | |
| 6,722,549 | B2 * | 4/2004 | Shkolnikov et al. | 227/10 |
| 6,948,647 | B1 | 9/2005 | Niblett et al. | |
| 7,111,364 | B2 | 9/2006 | Bader et al. | |
| 7,231,990 | B2 * | 6/2007 | Lai | 173/170 |
| 7,306,052 | B2 | 12/2007 | Vahabi-Nejad et al. | |
| 7,314,153 | B2 | 1/2008 | Musarella et al. | |
| 7,318,487 | B2 * | 1/2008 | Liao | 173/170 |
| 7,565,989 | B2 * | 7/2009 | Lai et al. | 224/269 |
| 7,681,661 | B2 * | 3/2010 | Sakai et al. | 173/217 |
| 7,942,299 | B2 | 5/2011 | Steinbrunner et al. | |

(Continued)

*Primary Examiner* — Bradley Duckworth

(74) *Attorney, Agent, or Firm* — Harness, Dickey & Pierce, P.L.C.

(57) ABSTRACT

A fastening tool rafter hook system supporting a power tool includes a power tool round section proximate to a tool handle. The round section has multiple pairs of indexing apertures, each positioned incrementally from a successive pair. A two piece rafter hook system includes: a first piece having a rafter hook band with a semi-circular band portion positioned in direct contact with the round section; and a second piece defining an "L" shaped rafter hook. The rafter hook includes: a first hook portion having first and second indexing bolts connected to the first hook portion; and a second hook portion oriented normal to the first portion. The first and second indexing bolts create detent connections when engaged with the indexing apertures. Connection of the first and second indexing bolts to any pair of indexing apertures releasably retains the rafter hook at selectable predefined orientations on the round section.

16 Claims, 11 Drawing Sheets

(56) References Cited

U.S. PATENT DOCUMENTS

| | | | | |
|---|---|---|---|---|
| 8,070,027 | B2 | 12/2011 | Piatt, Sr. et al. | |
| 8,087,556 | B2 * | 1/2012 | Oomori et al. | 224/269 |
| 8,167,056 | B2 * | 5/2012 | Ito et al. | 173/171 |
| 8,534,375 | B2 * | 9/2013 | Matsumoto et al. | 173/171 |
| 8,752,744 | B2 * | 6/2014 | Okouchi et al. | 224/268 |
| 2007/0181621 | A1 * | 8/2007 | Piatt et al. | 224/269 |
| 2008/0000939 | A1 * | 1/2008 | Walsh | 224/269 |
| 2009/0277939 | A1 * | 11/2009 | Ou | 224/269 |
| 2012/0085560 | A1 * | 4/2012 | Kuroyanagi et al. | 173/46 |
| 2013/0042730 | A1 * | 2/2013 | Griffin | 81/491 |
| 2013/0062498 | A1 * | 3/2013 | Ito et al. | 248/672 |
| 2014/0097217 | A1 * | 4/2014 | Walsh | 224/268 |

* cited by examiner

RAFTER HOOK FOR FASTENING TOOL

CROSS-REFERENCE TO RELATED APPLICATIONS

This application claims the benefit of U.S. Provisional Application No. 61/709,601 filed on Oct. 4, 2012. The entire disclosure of the above application is incorporated herein by reference.

FIELD

The present disclosure relates to support devices used to hang or temporarily support fastening tools such as nailers and cordless tools.

BACKGROUND

This section provides background information related to the present disclosure which is not necessarily prior art.

Fastening tool users, such as framing nailer users, need a way to hang the tool on surrounding material or their bodies while placing material or moving around. Most cordless nailers contain belt hooks that can be installed in a left-handed position or right handed position, but require the removal of fasteners to change position. Since this is time consuming and cumbersome, most users leave the belt hook in the original installed position and never change it.

With most cordless belt hook/rafter hook designs, a user would have to remove fasteners in order to change the position (left or right side) of the rafter hook. Most pneumatic nailers have a rotating belt hook that snaps onto the bottom of the tool. However, with cordless designs, this is difficult to implement because the battery is located at the bottom of the tool. This prevents any one piece from installing around a cylinder allowing for easy access.

SUMMARY

This section provides a general summary of the disclosure, and is not a comprehensive disclosure of its full scope or all of its features.

In an embodiment of the present disclosure, a two piece body allows separation between a sheet metal band (that will rotate around a designated place in the housings) and a hook that will allow storage on rafters or the user's belt. The two pieces are fixed together with a bolt and have indexing bolts placed in holes to find corresponding detents located around the housing cylinder. The housings allow a number of set positions, such as, for example, four set points of the belt hook for the user's convenience.

According to other aspects, a fastening tool rafter hook system for supporting a power tool includes a round section of the power tool positioned proximate to a tool handle. The round section has multiple indexing apertures. A two piece rafter hook system includes: a first piece consisting of a rafter hook band having a semi-circular band portion positioned in direct contact with the power tool round section; and a second piece defining an "L" shaped rafter hook having at least one indexing bolt connected thereto. The indexing bolt creates a detent connection when engaged with one of the indexing apertures. The connection of the indexing bolt to any one of the indexing apertures releasably retains the rafter hook at selectable predefined orientations with respect to the round section.

According to still other aspects, a fastening tool rafter hook system for supporting a power tool includes a round section of the power tool positioned proximate to a tool handle. The round section has multiple pairs of indexing apertures, each pair positioned incrementally from a successive one of the pairs. A two piece rafter hook system includes: a first piece consisting of a rafter hook band having a semi-circular band portion positioned in direct contact with the power tool round section; and a second piece defining an "L" shaped rafter hook. The rafter hook includes: a first hook portion having first and second indexing bolts connected to the first hook portion; and a second hook portion oriented substantially normal to the first portion. The first and second indexing bolts create detent connections when engaged with individual ones of the pairs of indexing apertures. The connection of the first and second indexing bolts to any one of the pairs of the indexing apertures releasably retains the rafter hook at selectable predefined orientations with respect to the round section.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
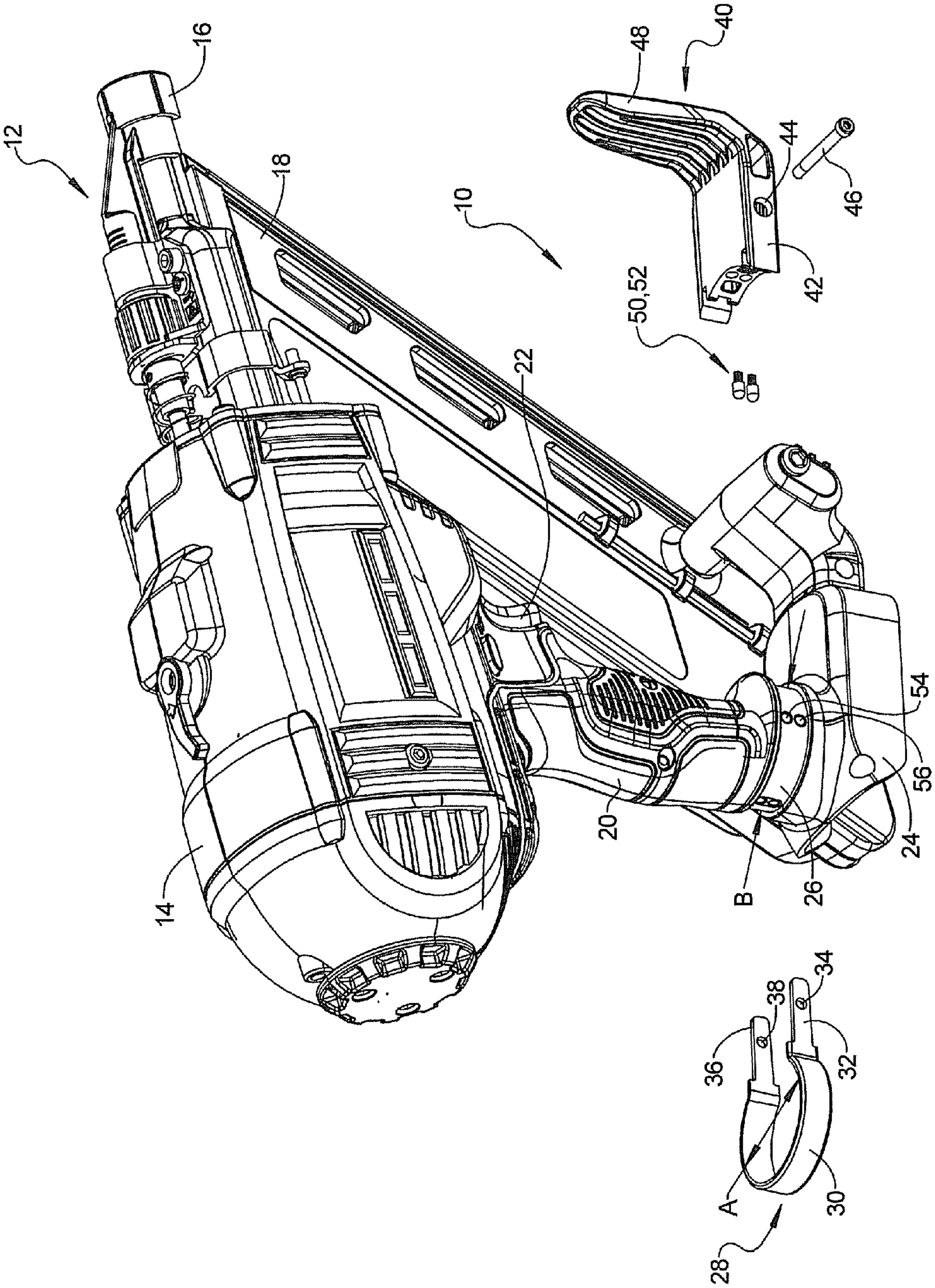
FIG. 1 is a top right side perspective view of a fastening tool and a fastening tool rafter hook system of the present disclosure.
Figure 2A:
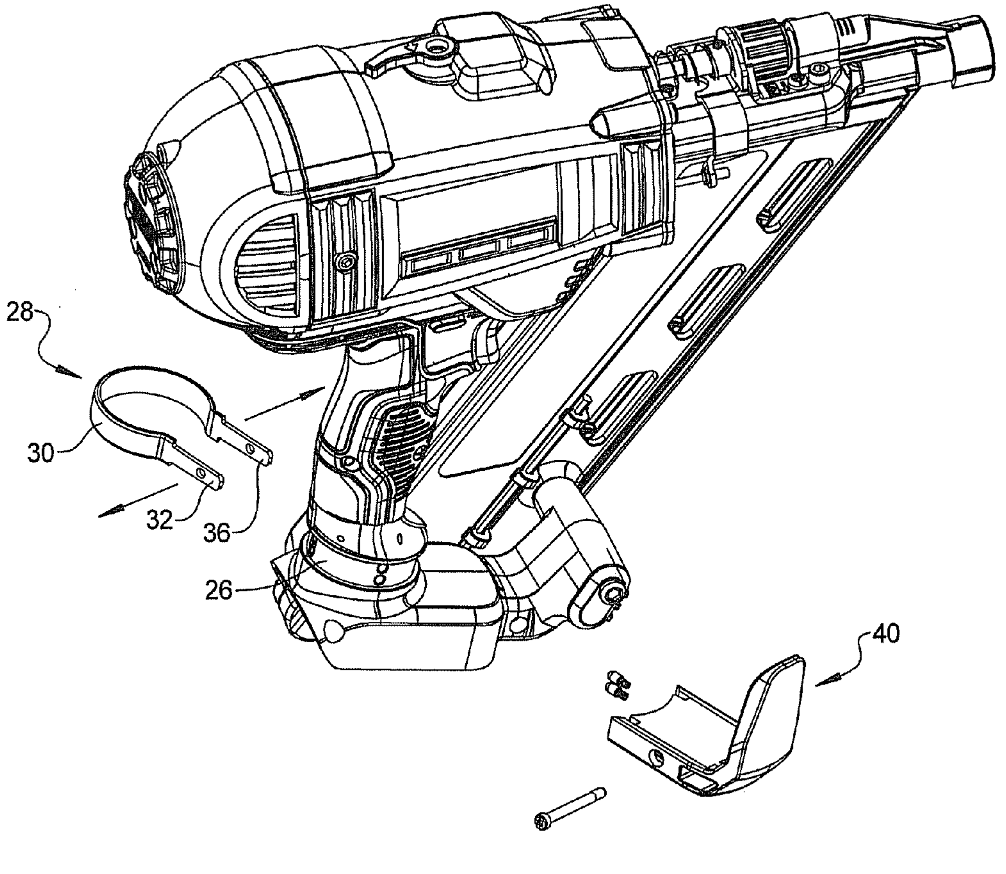
FIG. 2A is right side perspective view of the fastening tool and fastening tool rafter hook system of FIG. 1.
Figure 2B:
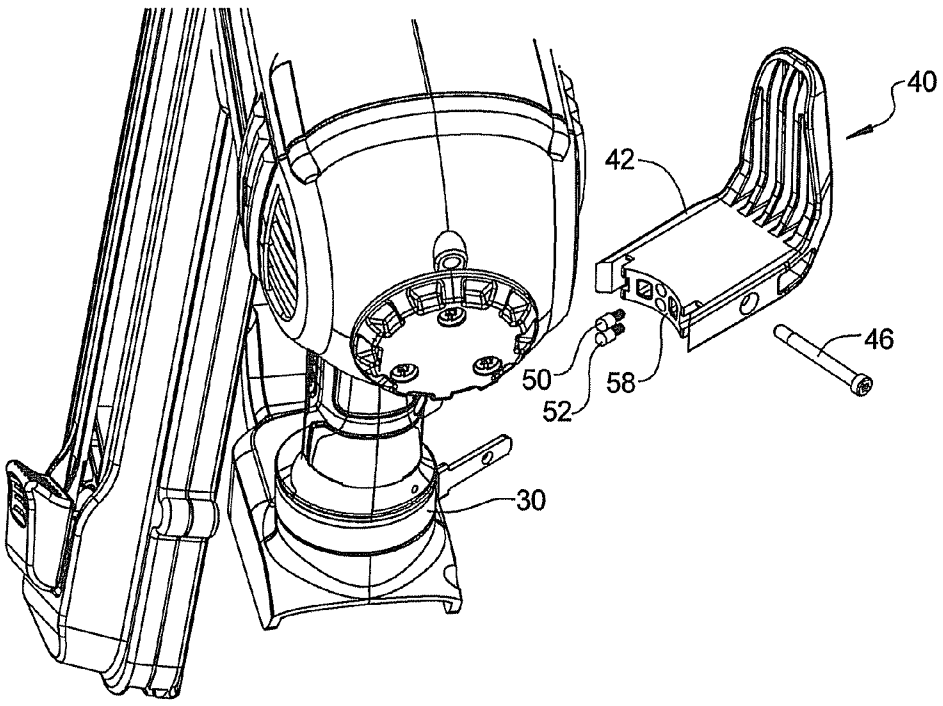
FIG. 2B is a rear perspective view of the fastening tool and fastening tool rafter hook system of FIG. 2A.
Figure 2C:
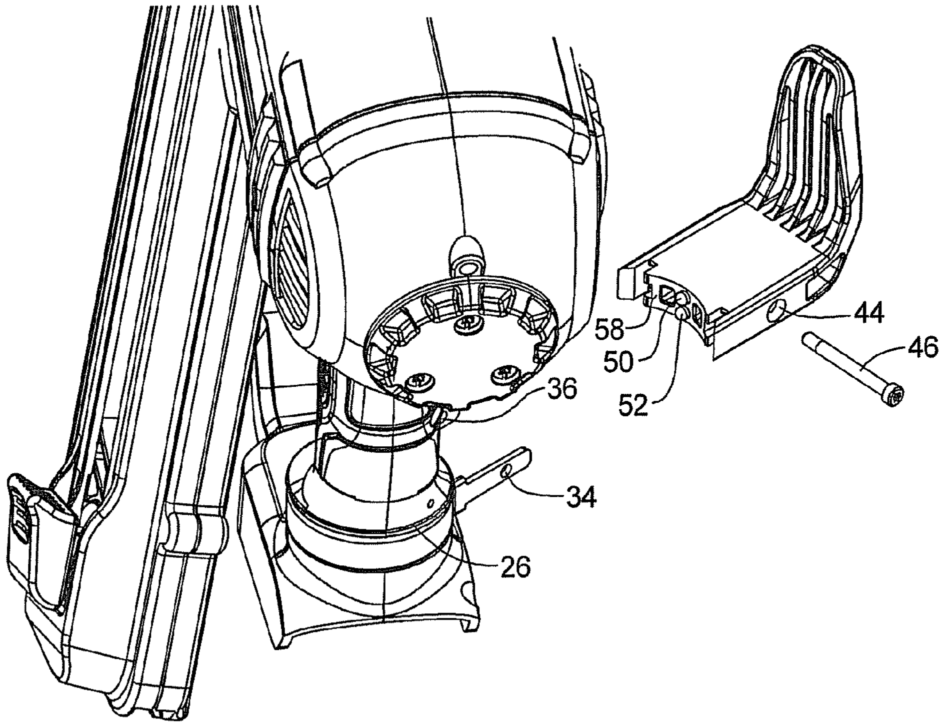
Figure 2D:
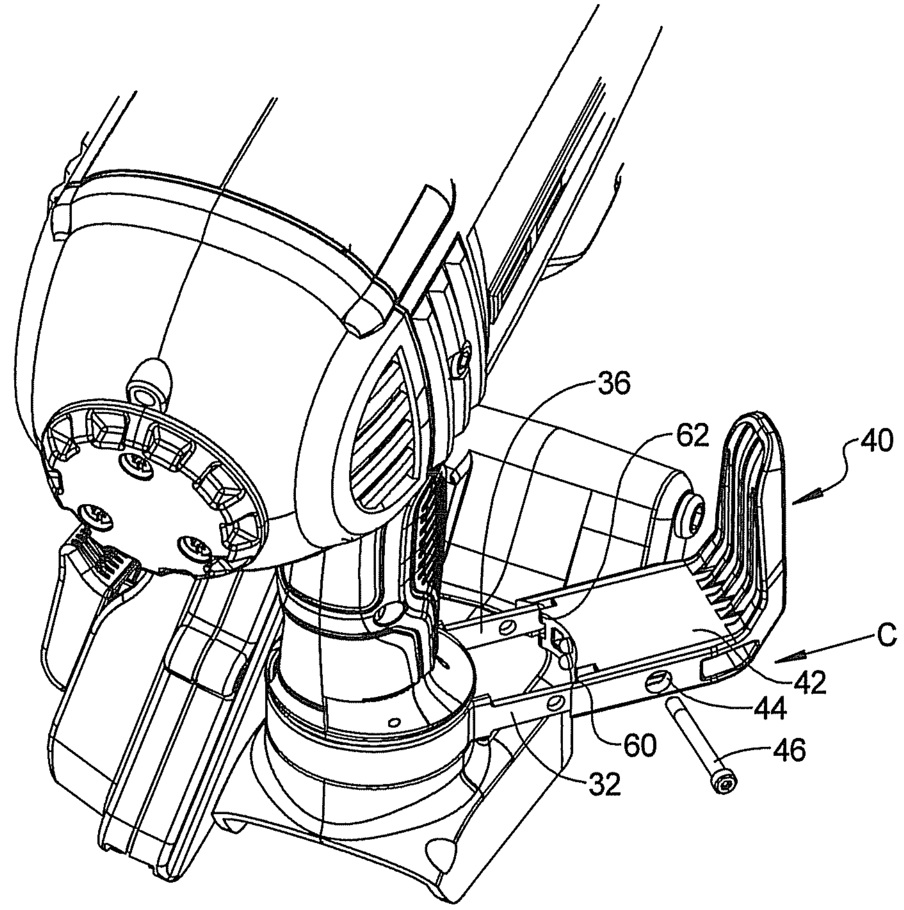
Figure 3A:
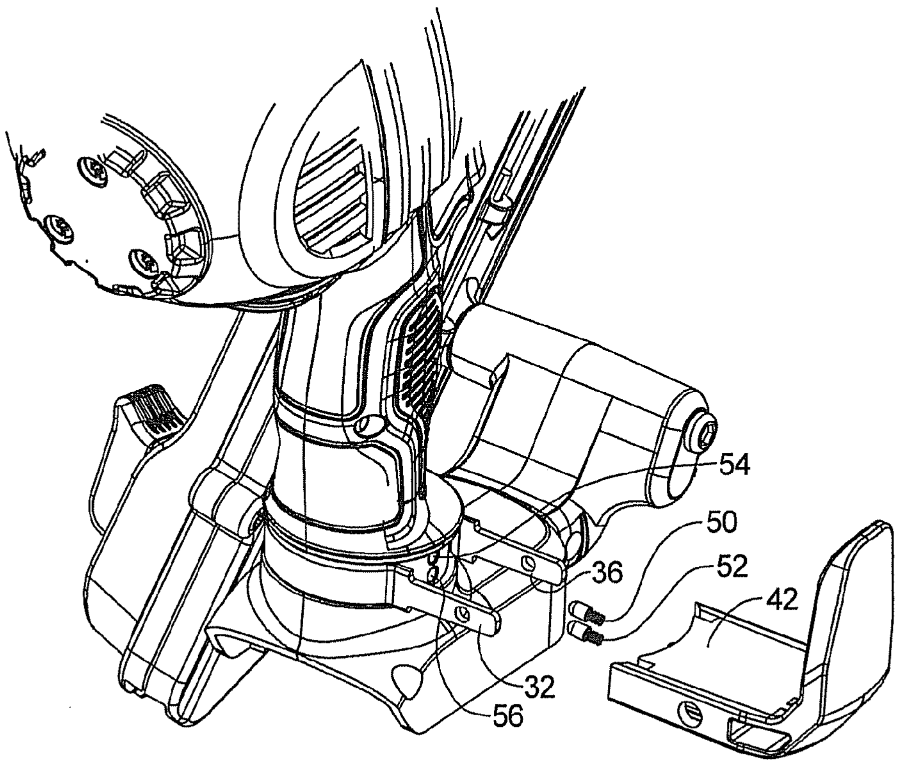
Figure 3B:
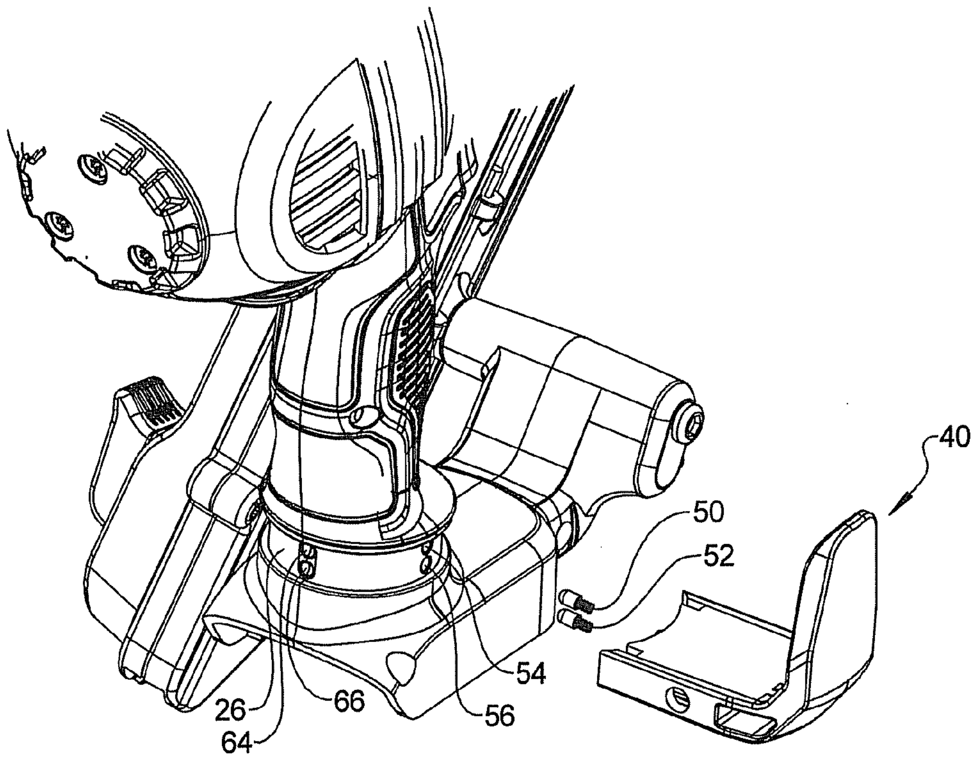
Figure 4A:
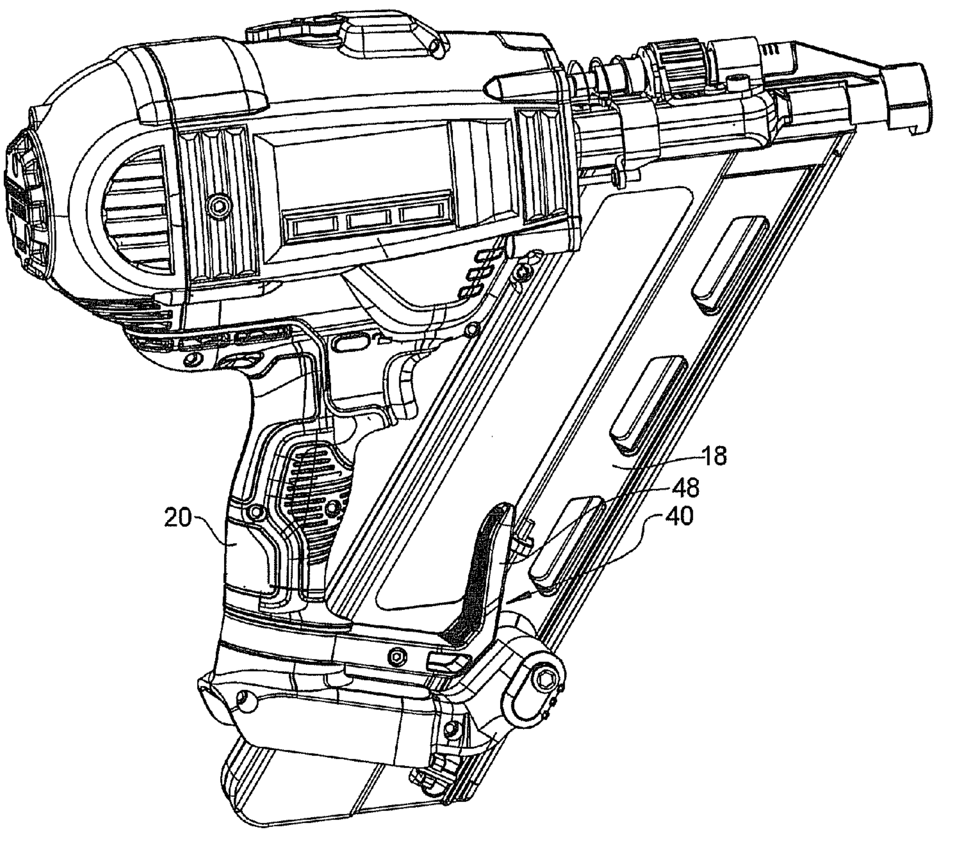
Figure 4B:
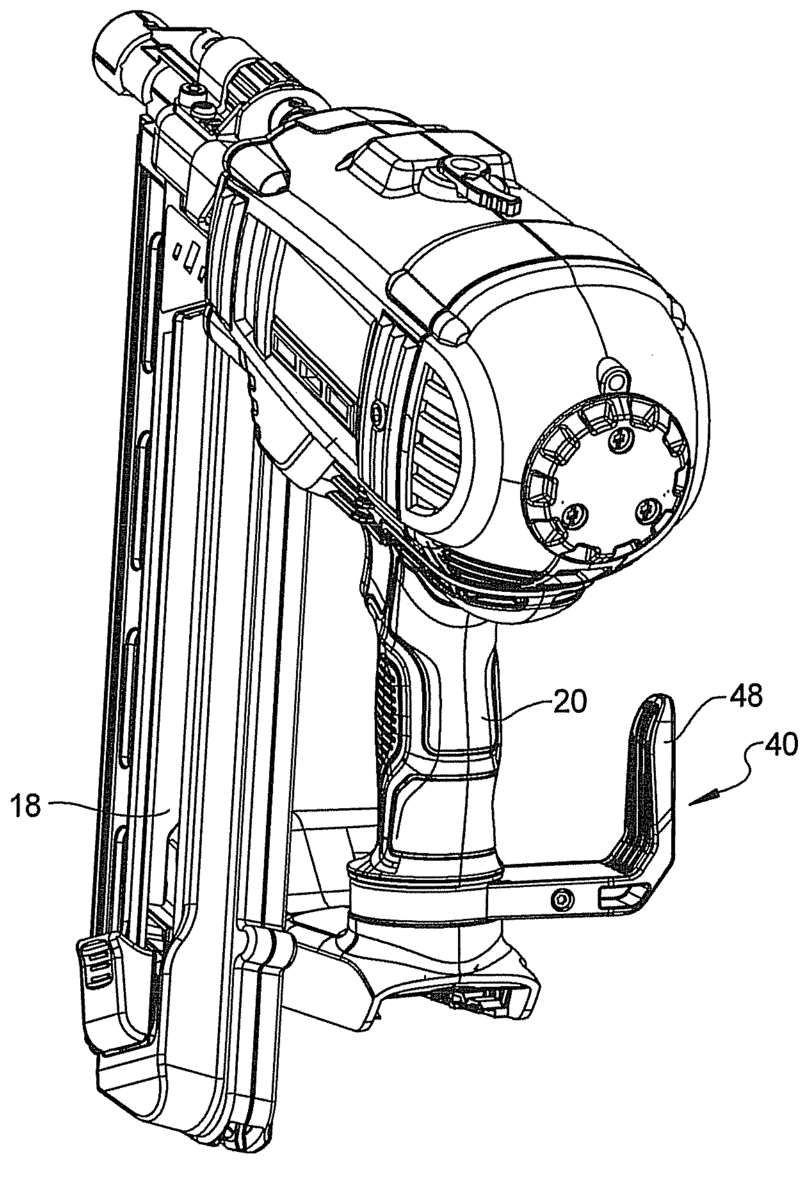
Figure 4C:
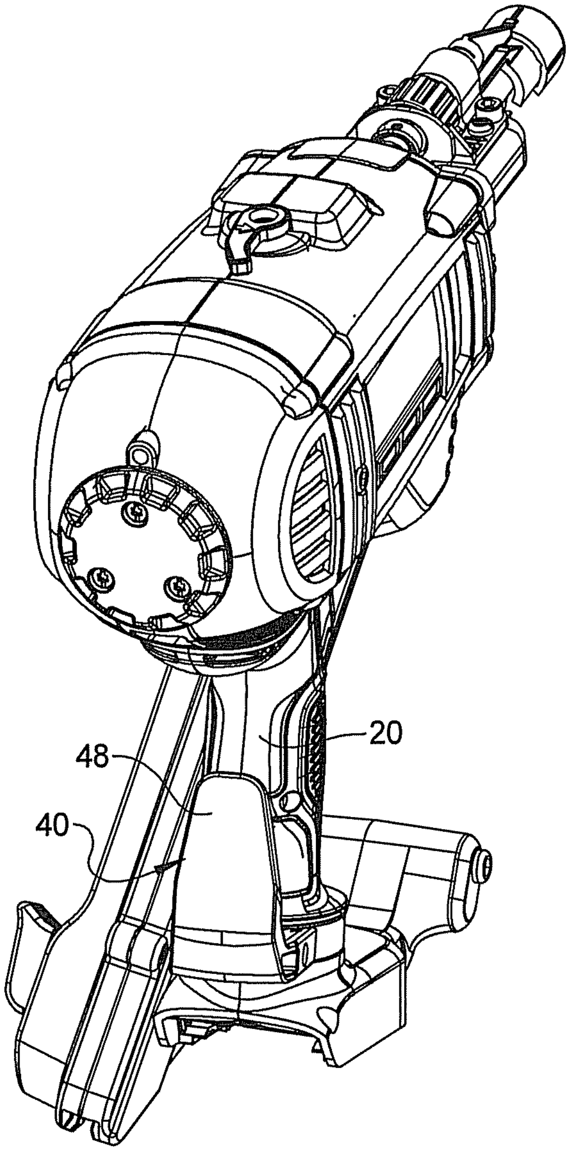
Figure 4D:
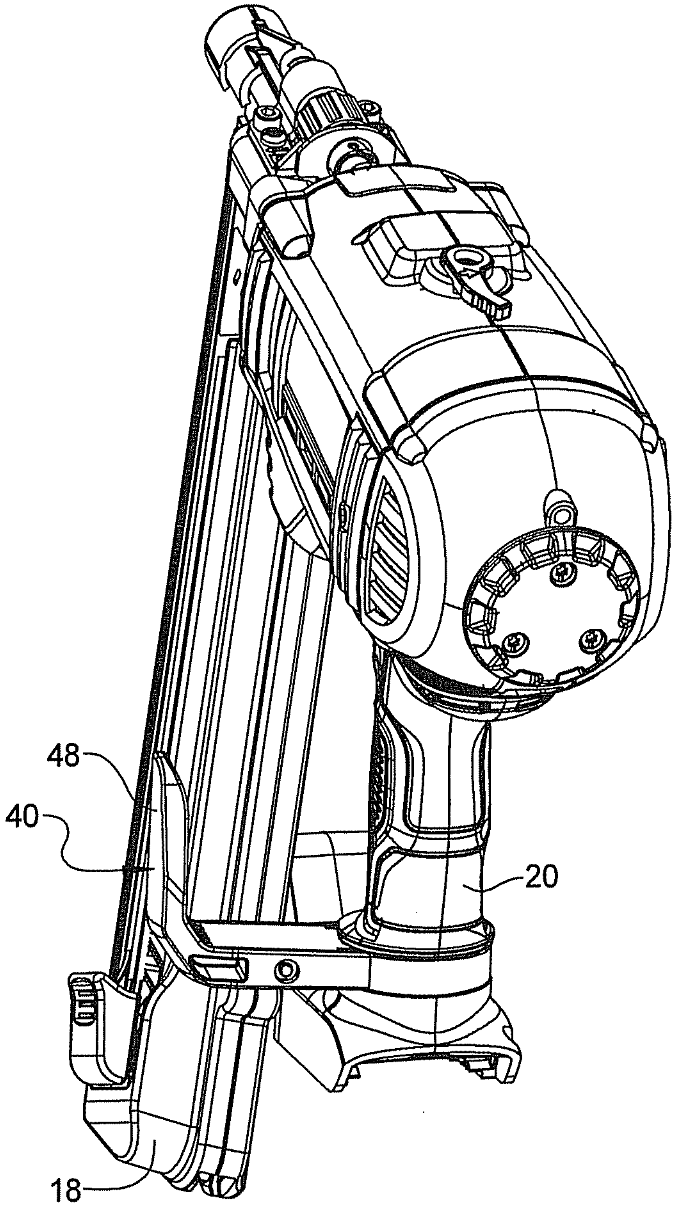

FIG. 2C a rear perspective view similar to FIG. 2B;

FIG. 2D is a right rear perspective view of the fastening tool and fastening tool rafter hook system of FIG. 1 in an assembled condition;

FIG. 3A is a right side perspective view of the fastening tool and fastening tool rafter hook system of FIG. 1 showing the rafter hook prior to connection with the rafter hook band;

FIG. 3B is a right side perspective view similar to FIG. 3A with the rafter hook band removed for clarity;

FIG. 4A is a right side elevational view of the fastening tool and fastening tool rafter hook system of FIG. 1 with the rafter hook system in a stowed position;

FIG. 4B is a left rear perspective view of the fastening tool and fastening tool rafter hook system of FIG. 1 with the rafter hook system in a right side, rafter hook position;

FIG. 4C is a right rear perspective view of the fastening tool and fastening tool rafter hook system of FIG. 4B with the rafter hook system in a back position; and FIG. 4D is a left rear perspective view similar to FIG. 4A, with the rafter hook system in a left side, belt hook position.

Corresponding reference numerals indicate corresponding parts throughout the several views of the drawings.

DETAILED DESCRIPTION

Example embodiments will now be described more fully with reference to the accompanying drawings.

Referring to FIG. 1, a fastening tool rafter hook system 10 is shown in a disassembled condition prior to installation on a fastening tool 12. According to several aspects, fastening tool 12 is a battery operated nailer, however fastening tool 12 can be any type of portable tool. Fastening tool 12 includes a housing 14 which contains components such as an electric motor and controls for operation of the electric motor. A drive device 16 extends forward of the housing 14 through which fasteners such as nails are driven. The fasteners are temporarily contained in a magazine 18 which can be connected to the drive device 16 for feeding the individual fasteners from the magazine 18 to the drive device 16. A handle 20 is connected to the housing 14 which provides a trigger 22 for actuating operation of fastening tool 12. Fastening tool 12 can be powered by a rechargeable battery set stored in a battery housing 24 which is mounted to a free end of the handle 20. The magazine 18 can further be connected to the battery housing 24 and/or to the handle 20.

Fastening tool rafter hook system 10 is releasably connected to fastening tool 12 at a round section 26 of the handle 20 where handle 20 connects to the battery housing 24. Fastening tool rafter hook system 10 is provided as a two-piece body. The first body piece is a rafter hook band 28 made of metal having a semi-circular band portion 30. The band portion 30 has a nominal diameter "A" which is equal to or greater than a diameter "B" of the round section 26 to permit the band portion 30 to freely rotate with respect to the round section. A first arm 32 having an aperture 34, and a second arm 36 having an aperture 38 integrally extend from opposite ends of the band portion 30. The band portion 30 is intended to wrap around greater than half of the perimeter of the round section 26.

The second body piece of fastening tool rafter hook system 10 is an "L" shaped rafter hook 40 made for example of a plastic. Rafter hook 40 includes a first hook portion 42 having a hook aperture 44 created therethrough. Hook aperture 44 receives a fastener 46 which also couples to first and second arms 32, 36 by extending through apertures 34, 38. Rafter hook 40 also includes a second hook portion 48 which is oriented substantially normal to first hook portion 42. First and second indexing bolts 50, 52 are also connected to first hook portion 42 which releasably engage pairs of indexing apertures such as first and second indexing apertures 54, 56 or other similar pairs of indexing apertures positioned at 90-degree increments in round section 26. Each pair of indexing apertures such as the first pair defining first and second indexing apertures 54, 56 create detent connections holding the rafter hook 40 at predefined orientations with respect to round section 26, which will be described in greater detail in reference to FIGS. 4A-4D.

Referring to FIG. 2A and again to FIG. 1, to initially install rafter hook band 28 on round section 26, the first and second arms 32, 36 are deflected away from each other allowing the band portion 30 to be pressed into contact with the round section 26. The rafter hook 40 is not yet engaged at this time.

Referring to FIG. 2B and again to FIG. 2A, after the band portion 30 is coupled to round section 26, the rafter hook 40 is assembled by installing the first and second indexing bolts 50, 52 in individual cavities created in an end face 58 of first hook portion 42. Fastener 46 is not installed at this time.

Referring to FIG. 2C and again to FIG. 2B, the first hook portion 42 is positioned such that the first and second indexing bolts 50, 52 are directed toward the round section 26. The first and second arms 32, 36 are oriented to face toward the end face 58 of first hook portion 42.

Referring to FIG. 2D and again to FIGS. 2C and 1, the rafter hook 40 is displaced in an installation direction "C" and the first and second arms 32, 36 are individually slidably received in first and second arm-shaped cavities 60, 62 created in end face 58. Displacement of rafter hook 40 in installation direction "C" continues until the first and second indexing bolts 50, 52 individually engage one of the first or second indexing apertures 54, 56 of the round section 26. At this time the hook aperture 44 is coaxially aligned with the apertures 34, 38 of first and second arms 32, 36 and the fastener 46 is inserted through the hook aperture 44 and each of the apertures 34, 38, coupling rafter hook 40 to the rafter hook band 28.

Referring to FIGS. 3A and 3B, and again to FIGS. 2D and 1, each of the first and second indexing bolts 50, 52 is sized to be slidably received in one of the first or second indexing apertures 54, 56 of the round section 26. Alternatively, the first and second indexing bolts 50, 52 can be inserted into other pairs of indexing apertures created at 90-degree increments about the perimeter of round section 26. These can include third and fourth apertures 64, 66 defining a second pair of indexing apertures. According to several aspects, four pairs of indexing apertures are provided, each pair positioned at a 90-degree increment with respect to a successive pair of apertures. By installing first and second indexing bolts 50, 52 into any pair of the indexing apertures incrementally located about the perimeter of round section 26, multiple stop positions of rafter hook system 10 are provided.

Referring to FIG. 4A, a stowed position of rafter hook system 10 is provided having the rafter hook 40 rotated forward of the handle 20 and the second hook portion 48 oriented normal to the magazine 18. The rafter hook 40 is not available for storage use in the stored position.

Referring to FIG. 4B, a right or rafter hook position of rafter hook system 10 is provided having the rafter hook 40 rotated to the right side of the handle 20 and the second hook portion 48 positioned oppositely about handle 20 with respect to the magazine 18. The rafter hook 40 is available for rafter storage use in the rafter hook position.

Referring to FIG. 4C, a back position of rafter hook system 10 is provided having the rafter hook 40 rotated to the rear of the handle 20. The rafter hook 40 is available for storage use in the back position.

Referring to FIG. 4D, a left or belt hook position of rafter hook system 10 is provided having the rafter hook 40 rotated to the left side of the handle 20 and the second hook portion 48 positioned parallel to the magazine 18. The rafter hook 40 is available for storage on a user's belt in the belt hook position.

A fastening tool rafter hook system of the present disclosure offers several advantages. The fastening tool rafter hook system provides the user a durable, easily adjustable rafter hook that they are used to seeing on pneumatic tools. The design allows for a rotational rafter hook with any number of set positions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fastening tool rafter hook system for supporting a power tool, comprising:

a section of the power tool positioned proximate to a tool handle, the section having multiple indexing apertures; and a two piece rafter hook system, including:

a first piece including a rafter hook band having a semi-circular band portion positioned in direct contact with the section of the power tool and first and second integral arms extending from said band portion, each of said first and second arms having an aperture formed therein;

a second piece defining an "L" shaped rafter hook having a first portion configured to project from said section of the power tool and a second integral hook portion, said first portion having an end face confronting said section of the power tool for receiving at least one indexing bolt that is inserted into said end face and an aperture arranged generally transverse to said indexing bolt, the indexing bolt creating a detent connection when engaged with one of the indexing apertures, the connection of the indexing bolt to any one of the indexing apertures releasably retaining the rafter hook at selectable predefined orientations with respect to the section;

wherein the first and second arms are configured to engage said first portion of said second piece on either side of said indexing bolt; and a fastener extending through the apertures in said first and second arms and through the aperture in said first portion of said second piece to secure said second piece to said first piece.

2. The fastening tool rafter hook system for supporting a power tool of claim 1, wherein the fastener is spaced from said end face by a distance sufficient to accommodate said at least one indexing bolt.

3. The fastening tool rafter hook system for supporting a power tool of claim 1, wherein the first and second arms are received in first and second arm-shaped cavities created in an end face of the rafter hook and the first and second apertures align with the hook aperture.

4. The fastening tool rafter hook system for supporting a power tool of claim 3, further including a fastener extending through each of the hook aperture and the first and second apertures acting to connect the first piece to the second piece.

5. The fastening tool rafter hook system for supporting a power tool of claim 1, wherein the second hook portion is oriented substantially normal to the first portion.

6. The fastening tool rafter hook system for supporting a power tool of claim 1, wherein the section of the tool member is a round section and wherein the band portion has a nominal diameter equal to or greater than a diameter of the round section of the tool member.

7. The fastening tool rafter hook system for supporting a power tool of claim 1, wherein the section of the tool member is a round section and wherein each indexing aperture is located at a 90-degree increment with respect to a successive one of the indexing apertures such that the rafter hook is releasably positionable in 90-degree increments about the round section of the power tool.

8. A fastening tool rafter hook system for supporting a power tool, comprising:

a round section of the power tool positioned proximate to a tool handle, the round section having multiple pairs of indexing apertures, each pair positioned incrementally from a successive one of the pairs;

a two piece rafter hook system, including:

a first piece consisting of a rafter hook band having a semi-circular band portion positioned in direct contact with the power tool round section, a first arm integrally extending from the band portion having a first aperture and a second arm integrally extending from the band portion having a second aperture, the first and second arms integrally extending from opposite ends of the band portion; and a second piece defining a rafter hook having:

a first hook portion having a hook aperture created therethrough and first and second indexing bolts connected to the first hook portion; and a second hook portion oriented substantially normal to the first portion; and the first and second indexing bolts creating detent connections when engaged with individual ones of the pairs of indexing apertures, the connection of the first and second indexing bolts to any one of the pairs of indexing apertures releasably retaining the rafter hook at selectable predefined orientations with respect to the round section;

wherein the first and second arms are received in first and second arm-shaped cavities created in an end face of the first hook portion of the rafter hook and the first and second apertures align with the hook aperture.

9. The fastening tool rafter hook system for supporting a power tool of claim 8, further including a fastener extending through each of the hook aperture and the first and second apertures acting to connect the first piece to the second piece.

10. The fastening tool rafter hook system for supporting a power tool of claim 8, wherein the band portion has a nominal diameter equal to or greater than a diameter of the round section of the tool member.

11. The fastening tool rafter hook system for supporting a power tool of claim 8, wherein each pair of the indexing apertures is located at a 90-degree increment with respect to a successive one of the pairs of the indexing apertures such that the rafter hook is releasably positionable in 90-degree increments about the round section of the power tool.

12. A fastening tool rafter hook system for supporting a power tool, comprising:

a section of the power tool positioned proximate to a tool handle, the section having multiple indexing apertures; and a two piece rafter hook system, including:

a first piece including a rafter hook band having a semi-circular band portion positioned in direct contact with the section of the power tool, a first arm integrally extending from the band portion and having a first aperture, and a second arm integrally extending from the band portion and having a second aperture, the first and second arms integrally extending from opposite ends of the band portion; and a second piece defining an "L" shaped rafter hook having a hook aperture created therethrough and at least one indexing bolt connected thereto, the indexing bolt creating a detent connection when engaged with one of the indexing apertures, the connection of the indexing bolt to any one of the indexing apertures releasably retaining the rafter hook at selectable predefined orientations with respect to the section;

wherein the first and second arms are received in first and second arm-shaped cavities created in an end face of the rafter hook and the first and second apertures align with the hook aperture.

13. The fastening tool rafter hook system for supporting a power tool of claim 12, further including a fastener extending through each of the hook aperture and the first and second apertures acting to connect the first piece to the second piece.

14. The fastening tool rafter hook system for supporting a power tool of claim 12, wherein the second piece of the rafter hook system further includes:

a first hook portion having the indexing bolt connected to the first hook portion; and a second hook portion oriented substantially normal to the first hook portion.

15. The fastening tool rafter hook system for supporting a power tool of claim 12, wherein the section of the tool member is a round section and wherein the band portion has a nominal diameter equal to or greater than a diameter of the round section of the tool member.

16. The fastening tool rafter hook system for supporting a power tool of claim 12, wherein the section of the tool member is a round section and wherein each indexing aperture is located at a 90-degree increment with respect to a successive one of the indexing apertures such that the rafter hook is releasably positionable in 90-degree increments about the round section of the power tool.

* * * * *